US008341068B2

(12) United States Patent
Koen et al.

(10) Patent No.: US 8,341,068 B2
(45) Date of Patent: Dec. 25, 2012

(54) METHOD AND APPARATUS FOR GENERATING AND EVALUATING IDEAS IN AN ORGANIZATION

(75) Inventors: Peter Koen, Hillsborough, NJ (US); Gerrit Kamp, New York, NY (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 400 days.

(21) Appl. No.: 12/335,041

(22) Filed: Dec. 15, 2008

(65) Prior Publication Data

US 2009/0182624 A1 Jul. 16, 2009

Related U.S. Application Data

(60) Provisional application No. 61/014,466, filed on Dec. 18, 2007.

(51) Int. Cl.
G06Q 40/00 (2012.01)
(52) U.S. Cl. .................... 705/37; 705/35; 705/1; 705/10
(58) Field of Classification Search .................... 705/15, 705/7.32, 7.36, 10
See application file for complete search history.

(56) References Cited

U.S. PATENT DOCUMENTS

| | | | |
|---|---|---|---|
| 5,950,176 A | 9/1999 | Keiser et al. | |
| 5,995,951 A | 11/1999 | Ferguson | |
| 6,505,174 B1 | 1/2003 | Keiser et al. | |
| 6,952,678 B2 | 10/2005 | Williams et al. | |
| 7,006,991 B2 | 2/2006 | Keiser et al. | |
| 7,730,002 B2 | 6/2010 | Afeyan et al. | |
| 7,801,759 B1 * | 9/2010 | Adams et al. | 705/7.36 |
| 7,831,455 B2 * | 11/2010 | Yoshida et al. | 705/7.32 |
| 2002/0095305 A1 * | 7/2002 | Gakidis et al. | 705/1 |
| 2003/0036947 A1 | 2/2003 | Smith, III et al. | |
| 2004/0162751 A1 * | 8/2004 | Tsyganskiy et al. | 705/10 |
| 2006/0106627 A1 | 5/2006 | Al-Nujaidi | |
| 2006/0143110 A1 | 6/2006 | Keiser et al. | |
| 2006/0271455 A1 * | 11/2006 | Lavoie et al. | 705/35 |

FOREIGN PATENT DOCUMENTS

| | | |
|---|---|---|
| WO | WO 00/26745 A2 | 5/2000 |
| WO | WO 2006/127881 A2 | 11/2006 |

OTHER PUBLICATIONS

Rite-Solutions, "Creating Inspiring Employees as Sources of Innovation."*

(Continued)

*Primary Examiner* — Samica L Norman
(74) *Attorney, Agent, or Firm* — Greenberg Traurig, LLP

(57) ABSTRACT

The present invention discloses a method and apparatus for generating and evaluating ideas within an organization through an idea market. It includes an automatic price-setting mechanism that modifies the share-price at the same instant that a trade is made, yet without the assistance of a market maker or a queue of orders. The instant price-setting is achieved by assuming a pre-defined relationship between the quantity of shares in the order and the average share price for that order. This relationship is the price-quantity function. The present invention also includes a mechanism of weighted parameters to modify the share-price in addition to pure supply and demand. The parameters can be adjusted over time in a neural network to optimize the relationship between the share price and the prediction of the actual idea value.

25 Claims, 16 Drawing Sheets

OTHER PUBLICATIONS

Bothos, et al., "Idea Selection and Information Aggregation Markets", pp. 1-5, IEEE, 2008.

LaComb, et al., "The Imagination Market", Springer Science + Business Media, LLC, pp. 245-356, Mar. 10, 2007.

Soukhoroukova et al., "New Product Development With Internet-Based Information Markets: Theory and Empirical Application", twelve pages (unnumbered), 2005.

Soukhoroukova et al., "Creating and Evaluating New Product Ideas With Idea Markets", pp. 1-28, Mar. 2007.

Lohir, Steve, "Betting to Improve the Odds", The New York Times, pp. 1-4 and 1-3, Apr. 9, 2008.

Taylor, William, "Here's an Idea: Let Everyone Have Ideas" The New York Times, pp. 1-3 and 1-2, Mar. 26, 2006.

"Creatively Inspiring Employees as Sources of Innovation", by Rite-Solutions, http://www.riedc.com/success-stories/rite-solutions, 2009.

LaComb, Christina, "What's Your Idea Worth?" Computing and Decision Sciences, pp. 1-5, Jun. 21, 2006.

Lavoie, et al.; "Rite-Solutions: Mavericks Unleashing the Quiet Genius of Employees", Stanford Graduate School of Business, Case: HR-27, Sep. 11, 2006, 30 pages.

\* cited by examiner

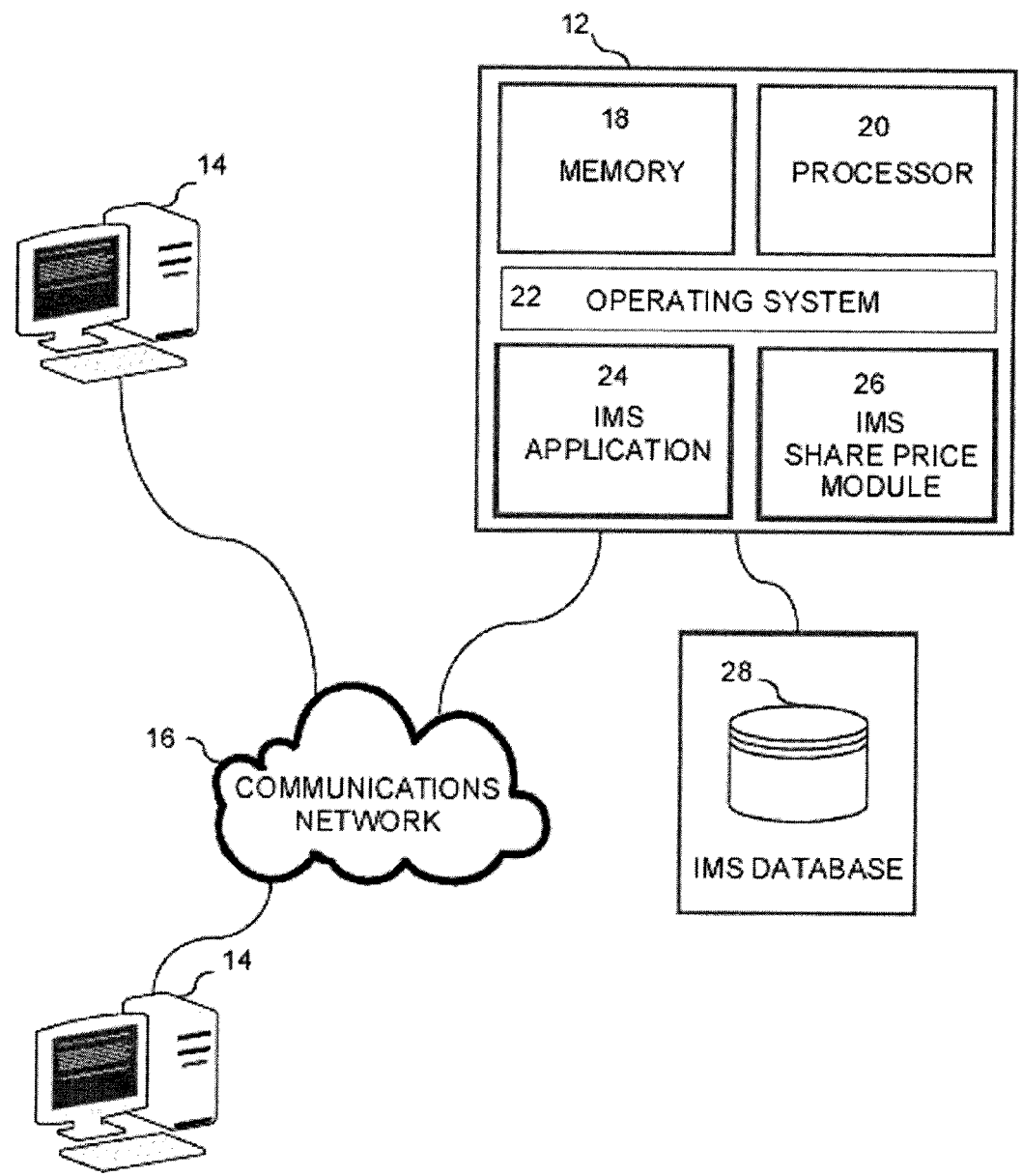
FIG. 1  Network configuration

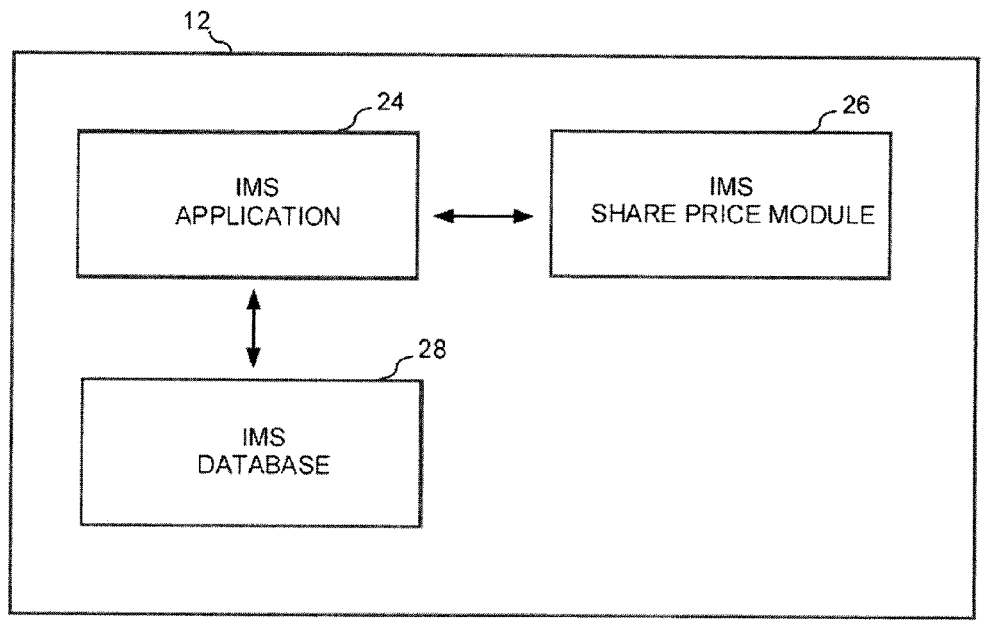
FIG. 2    Idea Market System
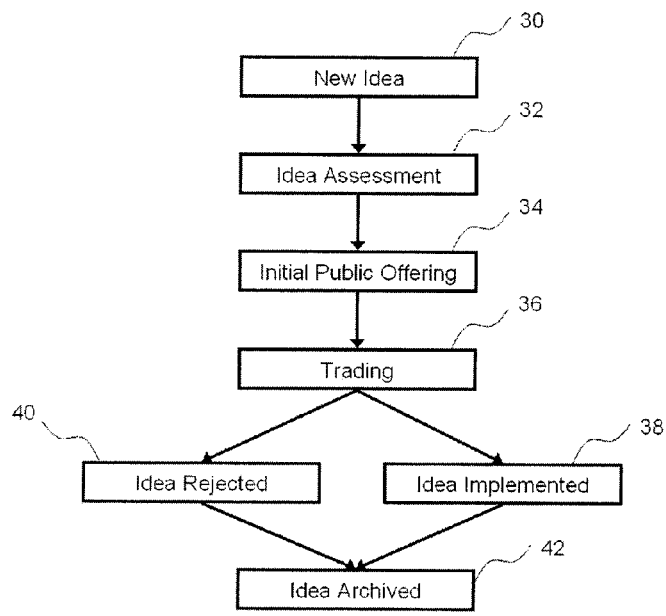
FIG. 3    Idea Lifecycle

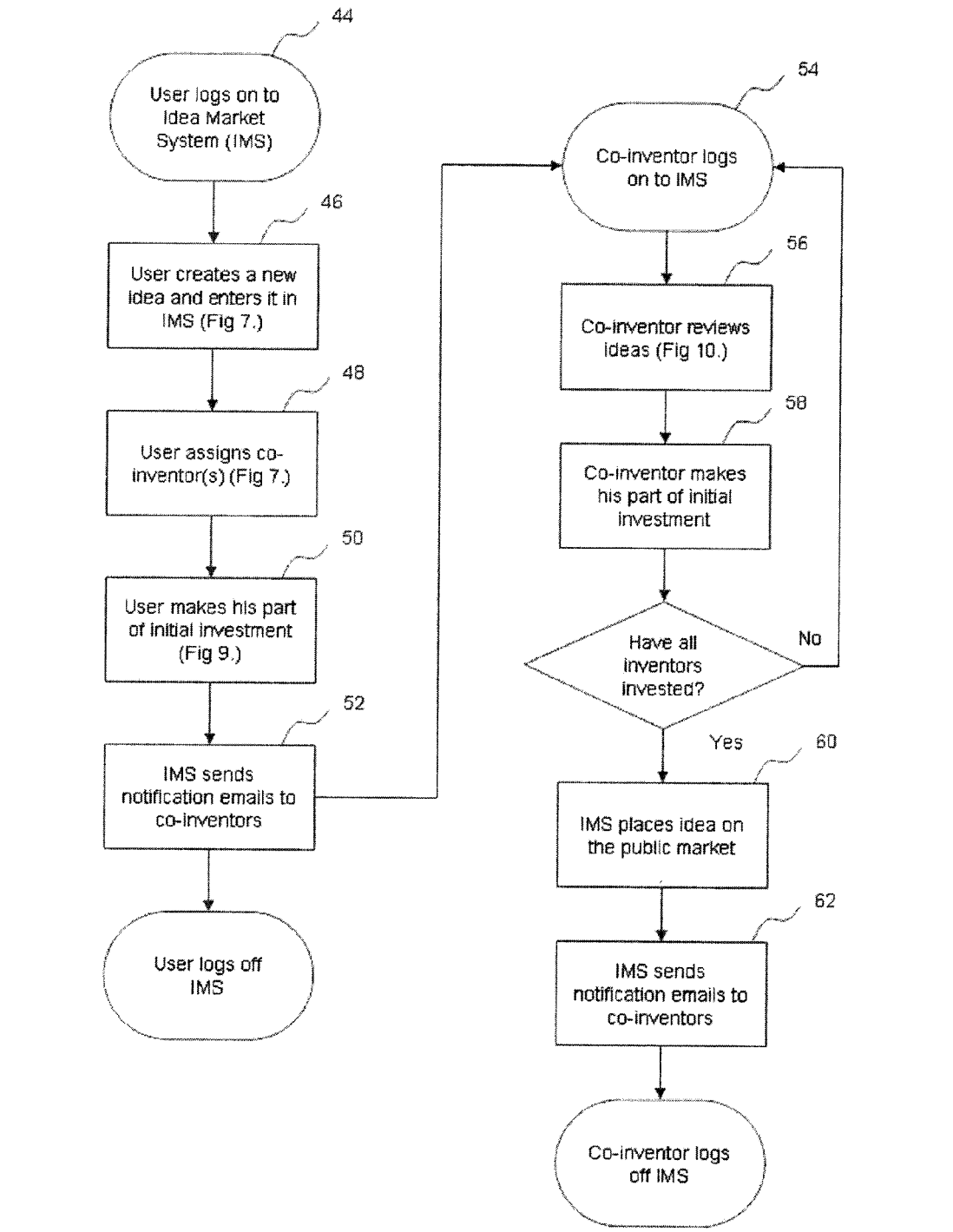
FIG. 4  Go public process

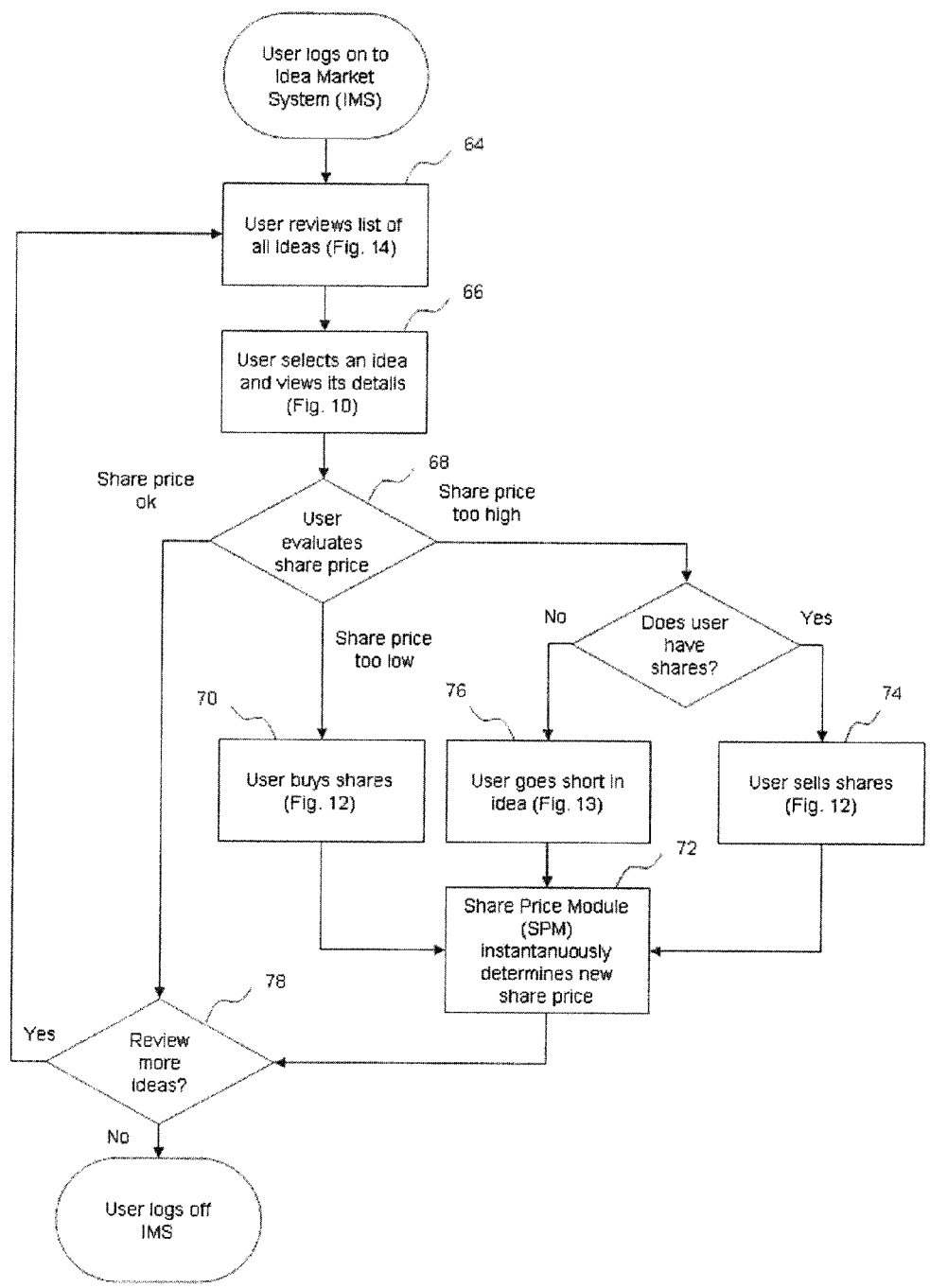
FIG. 5    Trading Process

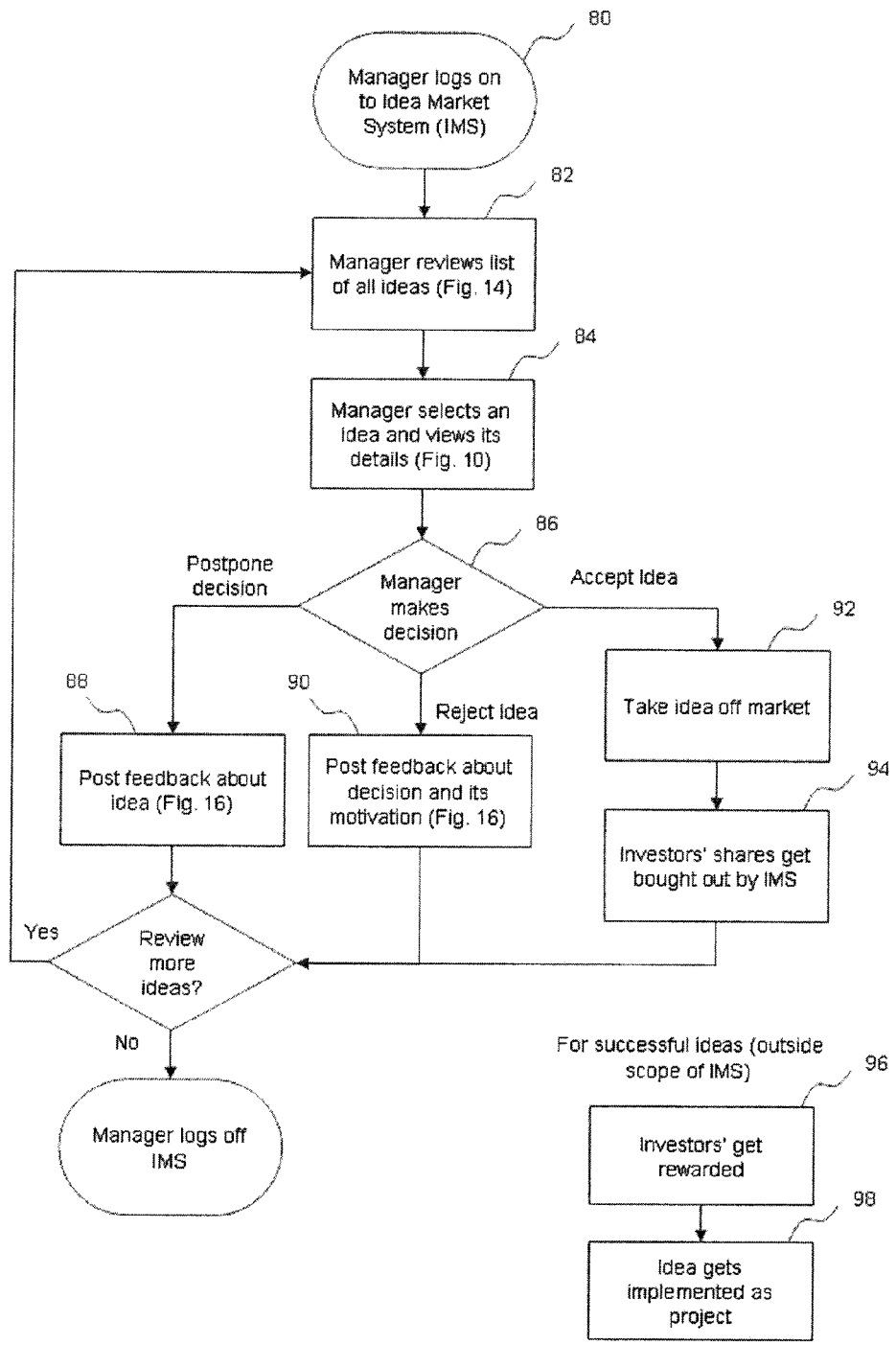
FIG. 6    Idea retirement process

Add New Idea

| Home | Add New Idea | My Ideas | My Shares | All Shares | Top Traders | Forum |
|---|---|---|---|---|---|---|

You are logged in as: gkamp
Logout

Search in Ideas and Discussion Forum

[search]

| Idea Name | Ticker Symbol | Idea Status | No. of Comments | Your role | Edit | Delete | Rate Risk | Go public |
|---|---|---|---|---|---|---|---|---|
| Clean Engine | CE | Public | 0 | Inventor | Edit | - | Rate Risk | - |
| Composite Coiled Tubing | CCT | Public | 4 | Inventor | Edit | - | Rate Risk | - |
| Fast Drillpipe Connector | FDC | Public | 0 | Inventor | Edit | - | Rate Risk | - |
| Non-stop Drilling Machine | NDM | New Idea | 0 | | Edit | Delete | Rate Risk | Go public |
| 128 | 130 | 132 | 134 | 136 | 138 | 140 | | 142 |

My Ideas

FIG.8

| | Home | Add New Idea | My Ideas | My Shares | All Shares | Top Traders | Forum |
|---|---|---|---|---|---|---|---|

Idea: Non-stop Drilling Machine - NDM

| | view idea | edit idea | delete idea | assess risk | audit trail | go public | my trades |
|---|---|---|---|---|---|---|---|

You are logged in as:
gkamp
Logout

Search in Ideas and Discussion Forum

[ search ]

| Idea Name | Non-stop Drilling Machine |
|---|---|
| Ticker Symbol | NDM — 146 |
| Your current account balance | $16,398.75 — 148 |
| Share price for your trade | $10.00 — 150 |
| Number of shares after trade | 500 — 152 |
| Change to your account | $-5,000.00 — 154 |
| Account balance after trade | $11,398.75 |

[ Go Public ] — 156

— 144

Go Public

FIG. 9

View Idea

| Home | Add New Idea | My Ideas | My Shares | All Shares | Top Traders | Forum |
|------|--------------|----------|-----------|------------|-------------|-------|

You are logged in as:
gkamp
Logout

Search in Ideas and Discussion Forum

[search]

Your current account balance is : $16,398.75 —184
The value of your shares portfolio is : $9,725.00 —186
The total value of your shares and account is : $26,123.75 —188

| Idea | Ticker | Number of Shares | Value | Number of Transactions | Trade |
|------|--------|------------------|-------|------------------------|-------|
| Composite Coiled Tubing | CCT | 100 | 925 | 14 | Trade |
| Fast Drillpipe Connector | FDC | 1900 | 3800 | 14 | Trade |
| Non-stop Drilling Machine | NDM | 500 | 5000 | 1 | Trade |

190  192  194  196

My Shares

FIG.11

| Home | Add New Idea | My Ideas | My Shares | All Shares | Top Traders | Forum |

Idea: Composite Coiled Tubing - CCT

| view idea | edit idea | trade | assess risk | audit trail | forum | my trades |

You are logged in as: gkamp Logout

Search in Ideas and Discussion Forum

[search]

| Idea Name | Composite Coiled Tubing |
| Ticker Symbol | CCT |
| Number of shares you currently have | 100 |
| Your current account balance | $16,398.75 — 198 |
| Share Price | $9.50 — 200 |
| Shares | 100 — 202 |
| Buy or Sell | Buy ▾ |

[Update Results]

The average price is not exactly the same as the current market price since your own transaction influences supply and demand.

| Share price for your trade | $9.75 — 204 |
| Number of shares after trade | 200 — 206 |
| Change to your account | -$975.00 — 208 |
| Trade Fee (1%) | -$9.75 — 210 |
| Account balance after trade | $15,414.00 — 212 |

[Submit] — 214

Regular Trade

FIG. 12

| Home | Add New Idea | My Ideas | My Shares | All Ideas | Top Traders | Analyze |

Search

Composite Coiled Tubing - CCT

| view idea | edit idea | audit trail | assess risk | trade | my trades | idea archive

Select the type of trade you want to make.

| regular trade | go short / cover |

| Idea Name | Composite Coiled Tubing |
| Ticker | CCT |
| Number of shorted shares you currently have | 0 |
| Liability of these shorted shares | $0.00 |
| Your current account balance | $5,023.56 |
| Maximum Allowable Short Exposure | $1,134.27 |
| Share Price | $9.30 — 216 |

| Shorted Shares | 100 — 218 |
| Go short or Cover shorted shares | Short ▼ |

Calculate Costs

The average price is not exactly the same as the current market price since your own transaction influences supply and demand.

220

| Share price for your trade | $9.05 |
| Number of shorted shares after your trade | 100 — 222 |
| Change to your account | $904.50 |
| Trade Fee | -$9.05 |
| Account balance after trade | $5,919.02 |

224 — Conduct Trade    Cancel Trade

Short Trade

FIG. 13

| Home | Add New Idea | My Ideas | My Shares | All Shares | Top Traders | Forum |
|---|---|---|---|---|---|---|

+ + + MGR - $11.25 + + + SOAR - $13.75 + + + EBCC - $10.75 + + + ION - $14.25 + + + BUG - $16.25 + + ·

| Idea Name | Ticker Symbol | Share Price ($) | Price Change ($, last 7 days) | Idea Status | No. of comments | Inventor |
|---|---|---|---|---|---|---|
| Non-stop Drilling Machine | NDM | 11.25 | 0.00 | Public | 0 | Gerrit Kamp |
| Clean Engine | CE | 11.25 | 0.00 | Public | 0 | Gerrit Kamp |
| Fast Drillpipe Connector | FDC | 6.75 | -4.50 | Public | 0 | Gerrit Kamp |
| Composite Coiled Tubing | CCT | 9.50 | -1.00 | Public | 0 | Gerrit Kamp |

You are logged in as: gkamp
Logout

Search in Ideas and Discussion Forum search idea archive

All Ideas

FIG. 14

| Home | Add New Idea | My Ideas | My Shares | All Shares | Top Traders | Forum |

You are logged in as:
gkamp
Logout

Search in Ideas and Discussion Forum

[search]

Idea: Composite Coiled Tubing - CCT

| view idea | edit idea | trade | assess risk | audit trail | forum | my trades |

234

Probability of Technical Success

| | 1-2 | 3-5 | 6-8 | 9-10 |
|---|---|---|---|---|
| Technical Gap | | | | |
| 1 ▽ | Large gulf between current practice and objective; must invent new science | Order of magnitude change proposed | Step change short of "order of magnitude" | Incremental improvement; more engineering focus |
| Program Complexity | | | | |
| 2 ▽ | Difficult to define; many hurdles | Easy to define; many hurdles | A challenge; but "do-able" | Widely practiced in the company |
| Technology Skill Base | | | | |
| 1 ▽ | Technology new to the company; almost no skills | Some R&D experience, but probably insufficient | Selectively practiced in the company | Widely practiced in the company |
| External Technology | | | | |
| 3 ▽ | Technology does not exist | Technology exists, but have no idea where to find it | Technology exists and is available -but the company has never used it. | We know where to get it and have integrated technology before |
| Manufacturing Capability | | | | |
| 1 ▽ | Manufacturing process unknown to us or anyone else | Manufacturing known to others; but unknown to us | Minor modifications to existing technology | Manufacturing Technology known and capacity (internal or external) is available |

232

Risk Assessment

FIG.15

| Home | Add New Idea | My Ideas | My Shares | All Shares | Top Traders | Forum |

You are logged in as:
gkamp
Logout

Search in Ideas and Discussion Forum

[search]

Idea: Composite Coiled Tubing - CCT

| view idea | edit idea | trade | assess risk | audit trail | forum | my trades |

236

Discussion Forum > Composite Coiled Tubing > Manufacturing Costs

Gerrit Kamp — Posted: 09-25-2007 14:25 — [Reply]
Is it not terribly expensive to manufacture pipes like this?

Gerrit Kamp — Posted: 09-25-2007 14:27 — [Reply]
Well, the difference that you have to throw the steel pipe away after using it twice, the composite coiled tubing can be used 100's of times. Therefore, in the long run, it is much cheaper.

Gerrit Kamp — Posted: 09-25-2007 14:28 — [Reply]
I see, thanks!

Gerrit Kamp — Posted: 09-25-2007 14:29 — [Reply]
Yes, it is more expensive, so you have to look at application areas where it makes more sense to use superior materials. Otherwise, don't bother.

Forum

FIG.16

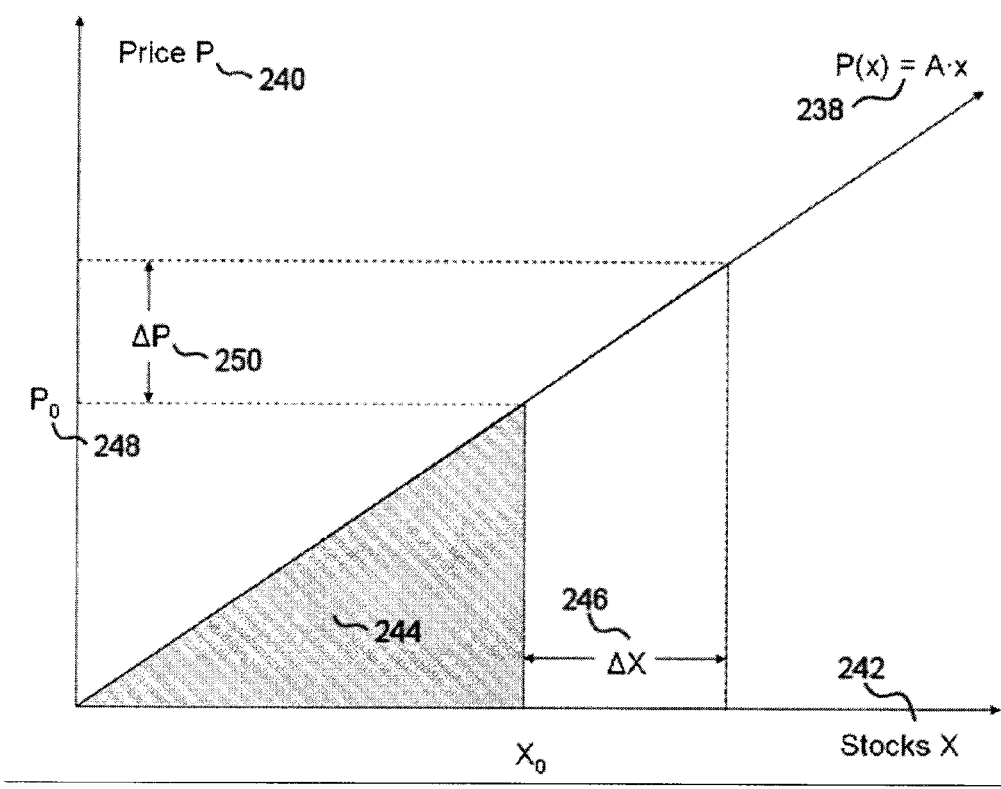
FIG. 17    Linear Market Mechanism

METHOD AND APPARATUS FOR GENERATING AND EVALUATING IDEAS IN AN ORGANIZATION

CROSS-REFERENCE TO RELATED APPLICATION

This application claims priority to U.S. Provisional Patent Application Ser. No. 61/014,466 filed Dec. 18, 2007, the entire disclosure of which is incorporated herein by reference in its entirety.

FIELD OF THE INVENTION

The invention relates generally to an enterprise management system and, more particularly, to an idea market system for recording, managing, improving and evaluating ideas.

BACKGROUND OF THE INVENTION

Prediction markets are speculative electronic markets created for the purpose of making predictions. Recently, there has been an increased interest in the possibility of using such markets to predict certain events (e.g., will the next U.S. president be a Republican or Democrat) or parameter (e.g., total sales next quarter). The current market prices can be interpreted as predictions of the probability of the event or the expected value of the parameter. Other names for prediction markets include information markets, decision markets, idea futures, preference markets, event derivatives, and virtual markets. Evidence so far suggests that prediction markets are at least as accurate as other institutions predicting the same events with a similar pool of participants. The underlying mechanism to achieve this accuracy is the leveraged information aggregation based on the market principle. People with more accurate information about the possibility of a certain outcome will tend to be willing to bet more real or play money and hence give more leverage to the prediction.

Idea markets are a special category of prediction markets. Unlike most prediction markets, idea markets are not tied to one particular event or outcome. Instead, the participants try to predict which ideas will at some point in time generate substantial value for their organization. Another distinction is that where most prediction markets are open for participation by the general public, access to idea markets needs to be restricted to members of an organization since many of the ideas represent significant strategic value for that organization. This means that the total number of participants is relatively low compared to other types of prediction markets. A further distinction is that with idea markets, the participants are free to enter new ideas, hereby creating new investment opportunities. This means that there is interaction between the idea generation and idea evaluation, which does not occur with other types of markets. A final distinction is that idea markets make it easier to reward successful investors with real money. On open prediction markets, this could be considered gambling and it is therefore illegal in many places. Organizations are free to reward their employees in various ways for value adding activities.

Traditionally, ideas are evaluated by a committee of one or more "experts" within an organization. These committees meet at regular intervals and discuss all the ideas that have been submitted by members of the organization. This form of deliberation has two main disadvantages. First and foremost, the quality of decisions through deliberation of groups of experts has been severely criticized. Deliberation within groups suffers from hidden profiles, information cascades, reputation cascades and group polarization. All these factors contribute to less than optimal decision making within groups of experts. This has been demonstrated in many research projects. A second problem with the traditional idea evaluation method is that idea submitters are often disappointed in the feedback they receive on their ideas and therefore loose motivation to submit an idea again in the future. Idea markets overcome both problems, and have proven to result in quality of decisions that are at least equal to, but often higher than group deliberation, and the market gives inventors immediate feedback on how their ideas are valued by a large group of people.

The value of an idea is supposed to be reflected in the share price of that idea. Therefore, the price-setting mechanism is a crucial component of an idea market system. With idea markets the trade-volume is relatively low, and therefore traditional methods of matching supply to demand do not work. It is possible to have periods without any supply and abundance of demand or vice versa. The liquidity of the market needs to be guaranteed even in such circumstances. Normal stock markets operate with "specialists" or "market makers", people who actively set the price based upon supply and demand and guarantee the liquidity. This approach is not economic and it introduces a delay. One solution is to automate the price mechanism which allows for instantaneous price updating, after the trade has taken place. However, this introduces yet another problem. If the price is modified immediately after the trade, it becomes possible to manipulate the system through generation of automatic profits. For example, by buying large quantities of shares, one can cause an upward price-change. By subsequently selling these shares in smaller quantities, one can reap immediate profits. Thus, a first problem with current idea markets is that there is no useful mechanism to automatically set prices instantly for small volumes of trades.

The main purpose of applying the market mechanism for idea markets is to aggregate information. The total sum of information that is present with all participants is most effectively aggregated using the market mechanism. However, due to the interaction between idea generation and idea evaluation, it may be beneficial to keep certain information hidden. Research has demonstrated that under certain circumstances anonymous feedback in computerized systems increases the quality of generated ideas. However, for optimal idea evaluation, it may be beneficial to reveal the identity of participants or traders. It is common knowledge that a very small percentage of people within an organization are responsible for the most valuable ideas. To know therefore what shares they trade in, or what comments they make on ideas is useful information. Thus, a second problem with current idea markets is that measures taken to get the maximum amount of information available (for idea evaluation) may work detrimentally to the idea generation aspect of the idea market.

Another related problem with the current art of idea markets compared to other stock markets is the lack of professional analysts. It is common knowledge that analyst reports can have significant influence on the investment decision of the general public. Such analysts are not present in idea markets, which means that the information available to investors may not be complete. For example, someone with great ideas in the organization might be in a high position and not have the time to provide all the details for his idea that are relevant. Someone with more time to spare but with lower quality ideas may actually provide so much information that investors feel more confidence for his idea. Given the relative small size of the idea market, such information bias may result in a price-bias.

U.S. Pat. No. 6,505,174 ("the '174 patent"), which includes reference to U.S. Pat. No. 5,950,176 and which corresponds to International Publication No. WO 00/026745 A2 is a patent currently assigned to HSX, Inc. The '174 patent describes an automated trading system as used on the Hollywood Stock Exchange. The algorithm used by the '174 patent for determining the share price is based on a matching between supply and demand orders. These orders are matched in periodic cycles, which is fundamentally different from the present invention. However, in the case wherein the cycle-time is reduced to 0, and therefore executed immediately after a single order has been received, the patent '174 patent can also be perceived as dealing with instantaneous trading. Yet the mechanism as described in the '174 patent is different from the mechanism in the current invention. An '174 patent algorithm checks with each trade order to determine if the Net Moving Balance (the difference between the number of shares in supply and demand) exceeds a certain pre-defined threshold. If it does not exceed the threshold, then the price stays the same. If it does exceed the threshold, then the price is increased by a certain pre-defined constant. After each trade, the thresholds are re-set. The disadvantages of this mechanism are twofold; a), with small trades, the price does not change, which makes it possible for a trader to conduct a large number of small trades without influencing the price; and b), the price changes in predefined increments, independent of the size of the trade. Thus with very large trades, prices will change with the same increment as with trades that are slightly larger than the thresholds. Both disadvantages result in a possible manipulation of the system by smart traders. The mechanism of the present invention does not have these disadvantages.

Furthermore, the '174 patent solution applies both a market braking and a market halting mechanism. The braking mechanism slows further price movement down in case of price movements that exceed a certain braking threshold. Should this mechanism not be effective enough (in an extreme bear or bull market) then a trade halting mechanism ensures that no trading is possible at all for the given security. The present invention does not provide either of these mechanisms. They are not necessary because the internal idea market is not subject to external sentiments which could give cause to bear or bull markets.

U.S. patent application Ser. No. 2006/0271455 ("the '455 publication") is currently assigned to Rite Solutions. The '455 publication describes how idea markets can be used to support idea generation and idea selection within an organization; however, the only reference that is made in the '455 publication to a price-setting mechanism is the notion that "a price analysis is performed during step 950". From an online article (i.e., http://www.riedc.com/success-stories/rite-solutions), it is clear that this price-setting is done manually, as indicated by the following statement contained therein: "a market maker (Don Stanford; retired CTO from industry) adjusts their prices based on the amount of intellectual investment each stock attracts from employees".

SUMMARY OF THE INVENTION

To overcome the above mentioned problems, the present invention includes an automatic price-setting mechanism that modifies the share-price at the same instant that a trade is made without the assistance of a market maker or a queue of orders. The instant price-setting is achieved by assuming a pre-defined relationship between the quantity of shares in the order and the average share price for that order. This relationship is the price-quantity function. The price-quantity function is the same for each idea or it can be different for different ideas. The function can be of any mathematical type (e.g., linear, polynomial, exponential, logarithmic etc) or combination of types.

To address the problem that certain information is not optimally reflected in the share price (for example due to information hiding for idea generation), the present invention also includes a mechanism of weighted parameters to modify the share-price in addition to pure supply and demand. The parameters can be adjusted over time through a learning mechanism (such as in a neural network) to optimize the relationship between the share price and the actual idea value.

In accordance with an embodiment of the present invention, a method for generating and evaluating ideas within an organization includes the steps of obtaining a description of the various ideas, allowing members of the organization to invest investment units in one or more ideas, evaluating the ideas based on those investments, and determining the price of those investments automatically and instantaneously based on a pre-determined relationship between the price and the number of investment units. The method can also include the following features:

The relation between the price and the number of investment units is not necessarily the same for each idea.

The relationship between the price and the number of investment units is determined based on pre-registration by members of the organization before they are enabled to buy or sell investment units.

Members of the organization with access to the ideas have the rights and capabilities to modify the idea description.

Each idea can be evaluated by each member of the organization on a number of predefined criteria through a number of predefined scores.

A discussion is associated with each idea so that each member of the organization with access to the ideas can provide feedback to the ideas, and such feedback can be provided anonymously.

Members of the organization are notified of certain types of events of which they have given prior indication that they want to be notified of.

The rank order of those traders that have accumulated the highest value in their portfolio of investments is made known to all members of the organization.

An audit trail of changes to each idea is maintained and made visible for all members of the organization with access to the ideas.

In accordance with another embodiment of the present invention, a method for generating and evaluating ideas within an organization includes the steps of obtaining a description of the various ideas, allowing members of the organization to invest investment units in one or more ideas, evaluating the ideas based on those investments, and determining the price of those investments automatically, instantaneously based on a set of weighted factors, amongst which is the number of investment units. This method can also include the following features:

The weight factors are optimized over time by comparing the priority of selected ideas and their final success within the organization.

The relation between the price and the number of investment units is not necessarily the same for each idea.

The relationship between the price and the number of investment units is determined based on pre-registration by members of the organization before they are enabled to buy or sell investment units.

Members of the organization with access to the ideas have the rights and capabilities to modify the idea description.

Each idea can be evaluated by each member of the organization on a number of predefined criteria through a number of predefined scores.

A discussion is associated with each idea so that each member of the organization with access to the ideas can provide feedback to the ideas, and such comments may be made anonymously.

Members of the organization are notified of certain types of events of which they have given prior indication that they want to be notified of.

The rank order of those traders that have accumulated the highest value in their portfolio of investments is made known to all members of the organization.

An audit trail of changes to each idea is maintained and made visible for all members of the organization with access to the ideas.

In accordance with another embodiment of the present invention, a method and apparatus for generating and evaluating ideas within an organization includes a memory; at least one processor and an application, which operate to obtain a description of the various ideas, to allow members of the organization to invest investment units in one or more ideas, to evaluate the ideas based on those investments and to determine the price of those investments automatically and instantaneously based on a set of weighted factors, amongst which is the number of investment units; and a storage facility, which stores records of the various ideas, records of the various members of the organization and records of the investments the members of the organization have made in the various ideas.

BRIEF DESCRIPTION OF THE DRAWINGS

For a more complete understanding of the present invention, reference is made to the following detailed description of exemplary embodiments considered in conjunction with the accompanying drawings, in which:

FIG. 1 is a schematic view of a system constructed in accordance with an embodiment of the present invention;

FIG. 2 is schematic view of an idea market system constructed in accordance with the present invention;

FIG. 3 is a schematic flow chart illustrating a lifecycle of ideas within the idea market system of FIG. 2;

FIG. 4 is a schematic flow chart illustrating a process of publishing a new idea in the idea market system of FIG. 2;

FIG. 5 is a schematic flow chart illustrating a process of trading in shares of ideas in the idea market system of FIG. 2;

FIG. 6 is schematic flow chart illustrating a process of selecting ideas and removing them from the idea market system of FIG. 2;

FIG. 8 is a view of a screen shot utilized during the performance of showing the ideas of which the user is inventor or co-inventor;

FIG. 9 is a view of a screen shot utilized during the performance of publishing a new idea in the process of FIG. 4;

FIG. 11 is a view of a screen shot utilized during the performance of showing the ideas in which the user has made an investment;

FIG. 12 is a view of a screen shot utilized during the performance of conducting a trade in the process of FIG. 5;

FIG. 13 is a view of a screen shot utilized during the performance of conducting a short-trade in the process of FIG. 5;

FIG. 14 is a view of a screen shot utilized during the performance of displaying the ideas on the idea market system;

FIG. 15 is a view of a screen shot utilized during the performance of conducting a risk-assessment for a particular idea;

FIG. 16 is a view a screen shot utilized during the performance of conducting online discussions related to a particular idea; and FIG. 17 is a diagram illustrating a linear market mechanism of the idea market system of FIG. 2.

DETAILED DESCRIPTION OF THE EXEMPLARY EMBODIMENT

Figure 7:
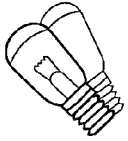
FIG. 7 is a view of a screen shot utilized during the performance of adding a new idea in the process of FIG. 4.

An idea market is an electronic market, within an organization or for the general public, in which participants can submit ideas, which can then subsequently be regarded as securities in which participants can invest. Participants' investments can include real or play money. The ideas that will generate most demand will result in the highest share prices or market value. At regular intervals, the ideas are evaluated and the organization decides to develop some of the ideas into real products, services or projects. Participants who had invested in those ideas will be rewarded, with real or play money or with other incentives. The organization may also decide to reward the inventors of the best ideas. Idea markets are mainly used within commercial organizations, due to their continuous need for new and innovative products and services to remain competitive. The expectation is that by utilizing idea markets, an organization will generate more ideas, and ideas that are more innovative, than it will without utilizing idea markets.

It is difficult to determine if the ideas in which participants invest most are also really the best ideas. In order to determine this, all ideas would need to be developed into real products or services. Clearly this is not desirable for any organization. An organization should also not automatically implement the highest valued ideas without a thorough review of the idea potential. Otherwise, participants may be tempted to manipulate the market by investing in ideas in which they have a personal interest. However, it is important that the results of the idea market are weighed strongly in the final decisions; otherwise people will stop investing time and energy in the idea market.

FIGS. 1 and 2 illustrate an idea market system (hereinafter "the IMS system 10") constructed in accordance with the present invention. The IMS system 10 is adapted to generate and evaluate ideas within an organization by facilitating organizational participants in recording and publishing a description of various ideas, and investing and trading in the investment units in the various ideas. The IMS system 10 further facilitates evaluating the ideas by determining the price and investments in the ideas, when traded by the participants, automatically and instantaneously based on a pre-determined relationship between the price and the number of investment units traded.

The IMS system 10 is operated within an electronic network as shown in FIG. 1. The mode of operation is within a server-client network, in which the IMS system 10 is hosted on a server 12 and participants use client terminals 14 to connect to the IMS system 10 via a communication network 16. The server 12 includes a memory 18, at least one processor 20, an operating system 22 and an IMS application 24. The IMS system 10 includes an IMS share price module 26 which is adapted to determine the share prices of the ideas, instantaneously at the time the shares of the ideas are traded in the IMS system 10. IMS data is stored in an IMS database 28, which is an additional component of the server 12. Those skilled in the art will recognize that the various functions of the server 12 can be performed by on one single computer or in an architecture of a set of connected computers. The communication network can be internal to the organization (intranet), external to the organization (internet) or a combination of both (extranet). Those skilled in the art will recognize that other configurations of the electronic network are possible.

Referring specifically to FIG. 2, the IMS system 10 includes the IMS application 24, the IMS share price module 26 and the IMS database 28. The IMS systems 10 and the IMS share price module 26 are described in greater detail hereinbelow.

Referring now to FIG. 3, the lifecycle of an idea within the IMS system 10 is shown in a high level process flow. Detailed steps associated with these processes are described hereinafter. More particularly, the lifecycle of an idea generally starts with the submission of a new idea (see block 30) After the idea has been submitted, it is generally assessed at block 32 on completeness and perhaps an initial estimate of its value is made. This assessment has two main benefits. Firstly, it screens the ideas and ensures that ideas that really do not fit with the organizations goals and objectives are not entered in the IMS system 10. Secondly, it allows for an initial value estimation. Without such an estimation, each idea would have to start trading at the same value. With normal stock-markets, that is perhaps not a problem since trading happens only when there is both supply and demand, but in the current invention, trading can occur only when there is demand. Since some ideas are obviously more valuable than others, there would be a "first mover advantage". In other words, some ideas will obviously be undervalued and investors who notice that sooner than other investors can gain huge profits by investing quickly in the new security.

After the assessment, the idea will go through an Initial Public Offering (hereinafter "the IPO", see block 34). It is also possible to skip the assessment phase and go straight from the new idea to the IPO. In this case, each idea starts trading with the same share price. After the IPO, investors can trade (see block 36) in the new idea. After some time, the idea will be evaluated, and a decision is made to either develop it further as a new product, service or project at block 38, or to reject it at block 40. In both cases, the idea is moved to the idea archive at block 42.

With reference to FIG. 4, the process of putting an idea on the idea market system 10 starts with a user logging on to the IMS system 10 via a client terminal 14 at block 44. The user then creates a new idea at block 46 by pressing on a "Submit" button 122 on a "Add New Idea" tab (see FIG. 7). The user adds an idea name, a ticker symbol and a description of the idea. Other details may also be added that the user finds relevant for the idea, such as idea value, critical assumptions and attachments. It is also possible to assign co-inventors at block 48. When the inventor is ready with the idea, he/she presses a "Go-public" button 156 (see FIG. 9). He/she will be asked by the IMS system 10 to make an initial investment before the idea is published on the market at block 50. In an embodiment of the invention, the co-inventors will also have to invest in the idea before it is published to the market, but it is also possible to require this investment only from the inventor.

In case co-inventors also need to invest, the IMS system 10 will send email notifications (see block 52) to each of the co-inventors, notifying them of the new idea and the requirement for them to invest. Upon receipt of said email notification, the co-inventor(s) log on to the IMS system 10 at block 54. The co-inventor reviews the idea at block 56 and if he agrees with it, he will also invest by clicking on the "Go Public" button 156 (see FIG. 9) at block 58. If all inventors have made their contribution, the IMS system 10 will publish the idea on the idea market (see block 60). From this moment onwards, the idea is visible to all participants in the market and real trading can begin. The IMS system 10 also notifies all inventors that the idea went public (see block 62).

Referring now to FIG. 5, the process of trading starts with a user logging on the IMS system 10. The user will then review the list of all the ideas that are in the system, to see for example if there are new ideas or if new comments have been posted about existing ideas (see block 64). The user may select an idea and look at it in more detail at block 66 and observe the current share price and make a mental assessment about this price at block 68. If the user finds the price too low, the user should buy shares at block 70 (see also FIG. 12). If the user does so, the share price will be instantaneously adjusted by the IMS share price module 26 at block 72. This price change happens during the trade so as to remove market manipulation options (e.g., such as those options described hereinabove).

If the user thinks the share price is too high, then the user has two options: a) if the user previously had acquired shares in the idea, the user may sell some or all of these at block 74, or b) if the user has no shares in the idea, he/she might decide to go short in the idea (see block 76). Both of these actions will result in a price-drop of the idea during the trade. If the user wants to review other ideas (see block 78), the process will repeat itself starting at block 64.

FIG. 6 illustrates the process of idea selection, which is started by a manager logging on to the IMS system 10 at block 80. After logging on, the manager may review the list with all ideas (see block 82) and then select one for a detailed review (at block 84). A decision may be made about what to do with that idea at block 86. In case of uncertainty, the manager may post some feedback at block 88 and continue with a review of the next idea. In case of a definite rejection, the manager should give feedback to the participants through a discussion forum (see FIG. 16), explaining the motivation for the decision at block 90. This gives the investors an opportunity to sell their shares and at least get part of their investment back. In case the idea seems to be very valuable to the organization, the manager may actively take the idea off the market (at block 92). From this moment on, it is not possible to trade in the idea any longer. The investors are bought out by the IMS system 10 at block 94, which means that they get their (play) money back which can subsequently be invested in other ideas. The investors in the idea can also receive real monetary rewards (see block 96), but this depends on the policies of the organization in which the IMS system 10 is implemented. Ideas that are selected will generally be implemented as projects at block 98. However, these two steps are outside of the scope of the IMS system 10.

Referring specifically to FIG. 7, an "Add New Idea" screen is shown which is utilized to add new ideas to the IMS system 10. The minimum details that are required to enter a new idea are the idea name which the user enters in field 100, a ticker symbol which the user enters in field 102, and the idea description which is entered in field 104. Specific fields are provided for the inventor to enter the idea value (field 106) and critical assumptions (field 108). The idea can be related to one or more relevant business areas that are listed in field 110, and one or more relevant categories that are listed in field 112. Both the business areas and categories will generally be specific to the organization in which the IMS system 10 is functioning. It is also possible to assign one or more co-inventors in field 114, who then may get editing rights to the idea. The current status of the idea (i.e., New Idea) is indicated in field 116. The inventor can attach documents in field 118 and images in field 120, and submit the idea by pressing the "submit" button at field 122. In this user interface screen there is an indicator at field 124 which displays which user is logged in, and there is also a search functionality field 126 which enables the user to find ideas or comments that are related to keywords.

FIG. 8 is a user interface screen that illustrates how an idea enters the "My Ideas" list upon submission (i.e., pressing the "submit" button at field 122 on the screen show in FIG. 7). This My Ideas list shows all ideas of which the logged in user is either inventor or co-inventor. The idea name is shown in field 128, which is a hyperlink to the full details of the idea. The ticker symbol is shown at field 130, and the idea status is shown in field 132. As long as the idea did not "go public" (i.e., IPO at block 34 in FIG. 3), it will be displayed as a "new idea" in the idea status column at field 132. Indications of the number of comments that are made about ideas are shown at field 134. The role of the logged in user is shown in field 136, such role being that of either inventor or co-inventor. As long as an idea is still in the "new idea" status, it can still be deleted in field 138. It can always be edited in field 138. The inventor can provide a risk-assessment for the idea in field 140, and when the idea is still in the "new idea" status, the inventor or a co-inventor can decide to "go public", to initiate the IPO process as indicated in field 142. The IPO process is described in greater detail hereinbelow.

Another facet of the present invention is that every participant may modify each idea description. This way of open collaboration has been used successfully in collaborative environments such as wikipedia.org. The benefit of allowing this open collaboration is that more information will be aggregated in a timelier manner.

FIG. 9 depicts a user interface screen that is utilized to enable an investor to make a required initial investment in the idea before the idea can go public. The idea is identified by its name and ticker symbol in field 144. The amount of cash in the inventor's account is shown in field 146, as well as the pre-determined share-price (see field 148) and number of shares which need to be acquired before the idea can go public (see field 150). The effect on the inventor's cash-position is shown in fields 152 and 154, respectively. When the Go Public button is pressed at field 156, the idea is published in the IMS system 10 (i.e., see the "All Ideas" screen illustrated in FIG. 14 which is described hereinafter), the shares displayed in field 150 are added to the inventor's portfolio, and the amount (see field 152) is subtracted from the inventor's account.

Figure 10:
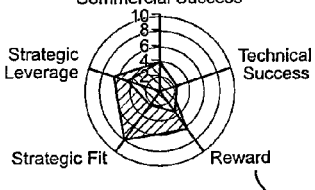
FIG. 10 is a view of a screen shot utilized during the performance of showing the details of a particular idea.

FIG. 10 shows a user interface screen on which a user may view an overview of details of an idea when he/she clicks on a hyperlink of the idea name of the idea (e.g., on field 128 on FIG. 8, or on field 226 on FIG. 14). This overview shows all the information and functions that are relevant for and related to this idea. The idea is identified by its name and ticker symbol at field 158. A second menu bar, which is displayed at field 160, shows the different functions that can be executed for an idea. Most of the idea details can be edited at field 162. When the idea goes public, it is possible to trade it at field 164. A risk-assessment can be carried out at field 166, and an audit trail is available at field 168 which shows all the changes that have been made to the idea over time. Access to a forum (see FIG. 16 which is described hereinafter) is available at field 170, and a button is available at field 172 which provides access to display all trades that the user has made with this idea.

Continuing to refer to FIG. 10, field 174 provides an idea overview which includes a spider-plot with consolidated risk assessments. The results of any assessment done by the inventor and co-inventors are consolidated into one set of results, and assessments made by anybody else are consolidated into a "public" dataset. It is possible to display only the inventor(s) dataset, or only the public one, or both. The idea overview also shows a chart with the share-price at field 176. This chart can be displayed for various time intervals (e.g., for the last hour, day, week, month, quarter or year). The current share-price and the market value (share-price times shares outstanding) are shown at fields 178 and 180, respectively, as well as the date when the idea was created and when it was last modified (see field 182).

A participant in the IMS system 10 can get an overview of his/her investments in the "My Shares" user interface screen shown in FIG. 11. This overview shows his current account balance at field 184 which represents cash available for investments. The value of participant's portfolio of shares, as well as the total value of his/her securities are displayed at fields 186 and 188, respectively. The screen shows all the ideas in which the participant has invested. It shows the number of shares at field 190, the value of these shares at field 192, how many transactions the participant has conducted with this particular idea at field 194, and it also has a button that allows the participant to trade at field 196. The number of transactions (see field 194) may hyperlink to a page that shows each individual transaction.

FIG. 12 shows a user interface screen a participant may utilize to conduct trades. The current share price of the idea is listed on field 198. The participant can change the number of shares into any integer, at field 200, and also change the trade-action into "buy" or "sell" at field 202. The information in the lower part of the screen will be automatically updated when the participant changes the number of shares (at field 200) or the trade-action (at field 202). The first piece of information that gets revised is the share price for this particular trade. Since the price is determined automatically during the trade by the IMS share-price module 26, the price that the participant pays/receives per share will depend on the number of shares he/she buys/sells. For small quantities, the price will be approximately the same as the current share price, but for larger trades, it will change more. The IMS share-price module 26, which has a Linear Market Mechanism that is functionally depicted in FIG. 17, is described in greater detail hereinafter.

Continuing to refer to FIG. 12, additional information is provided such as the number of shares the participant owns after completion of the trade which is displayed at field 206, the cash-change to the account (see field 208), the trade-fee (see field 210) and the cash balance after the trade (see field 212). The "submit" button at field 214 will only be visible if the participant has enough cash to buy the indicated number of shares (when he/she is buying), or if he/she has enough shares to sell (when he/she is selling). If these conditions are not met, the "submit" button will be inactive.

In addition to buying regular shares, the participant can also go short in trading an idea. More particularly, the participant may go short on the trade if he/she thinks that the share price of the idea is too high compared to other ideas, or when he/she expects the share price of the idea to go down in the foreseeable future. When a trader goes short, he/she borrows shares and immediately sells them on the market for the current price. This means that he/she obtains immediate cash, but also has a liability to give the borrowed shares back at some point in time. Giving back borrowed shares is called covering the shorted shares.

Referring now to FIG. 13, a user interface screen is illustrated on which the participant may make a short trade. The participant enters the amount of shorted shares in field 216 and presses the button entitled "calculate costs", and then enters his/her determination to buy short, or cover an existing short trade at field 218. The average share price per shorted share is shown at field 220, and the costs (or proceeds) of the entire transaction is shown at field 222. Once the participant presses the "Conduct Trade" button at field 224, the transaction is finalized.

Referring to FIG. 14, the "All Ideas" screen displays all the ideas (or shares) that are listed on the IMS system 10. A ticker-bar is shown on top of the screen at field 226 which shows the ticker symbols, and the current share price of each share. The ticker-symbols are hyperlinks to the detailed view of each idea and colors may indicate whether the ideas' share prices have recently been increased or decreased (e.g., green may denote price increase, red may denote share price decrease). The information displayed is similar to that of the My Ideas view shown in FIG. 8. The extra information that is shown on this screen are the share price at field 228, and the price change over the last 7 days at field 230. The price-change indicates if a share price is moving up or down.

With reference now to FIG. 15, a user interface screen is provided to enable each participant to make a risk assessment for each idea at field 232. During such an assessment, the participant is asked to score the idea on a set of given criteria. The score may be an integer in a range between 1 and 10 (see field 232), however non-integer numbers and other ranges may be utilized. A number of range-statements are provided at field 234 to give the participant some guidance during the scoring process. The scores of participants that are inventors or co-inventors may be consolidated together into an "inventor(s)" score, and those of all other participants may be consolidated together in a "public" score. It is possible to weigh the scores of each participant, for example, based on the number of shares he/she has.

FIG. 16 shows a user interface screen on which participants may engage in a discussion forum on each idea. In the forum, each member of the organization who is provided with access to the IMS system 10, is able to give feedback or ask questions related to a particular idea. This can be done by creating a new topic, or by responding to a given topic and posting responses at field 236.

Referring now to FIG. 17, the IMS share price module 26 includes a price mechanism. More particularly, the price of a share is determined by a mathematical price-quantity function. This can be a function of any type. In an embodiment of the present invention, this function is linear, of the form:

$P = A \cdot X$ (see reference numeral 238)

in which P (see reference numeral 240) is the price of the share, X (see reference numeral 242) is the quantity of shares (the sum off all shares that are owned by the participants) and A is a constant. In one embodiment of the invention, the value of A is 0.005.

The market value (MV) of the idea is equal to:

$$MV = \frac{1}{2} \cdot P \cdot X$$

(e.g., see reference numeral 244)

The benefit of this linear market model is that the price of the shares can be immediately calculated for any order of any size. It does not depend on a match between buy and sell orders. Suppose that a participant wants to buy $\Delta X$ (see reference numeral 246) shares. The market price before this trade is equal to $P_0$ (see reference numeral 248). The market price after the trade is equal to $P_0 + \Delta P$ (see reference numeral 250), which is equal to $P_0 + \Delta \cdot X$. The average price the participant pays for their shares is equal to $P_0 + \frac{1}{2} \cdot A \cdot \Delta X$.

In this mechanism, there is in principle an infinite amount of shares available. The more shares people buy, the higher the price rises, which will at some point induce people to sell their shares and gain profit. In a real stock-market, this would never work, because the shares represent pieces of ownership of an organization, and therefore, there has to be a fixed number of shares. In a virtual stock-market such as the IMS system 10, where the shares do not represent ownership, this is not a requirement.

However, this mechanism introduces another problem. Situations can occur when the share price of an idea is not representative of its value compared to other ideas. This could happen for example just after the IPO (in case the same starting price is used for each idea) or after certain information became available that would have a great impact on the value of the idea. In a normal stock-market, the price would react immediately, because potential buyers (or sellers) cannot find matching offers at the initial price anymore. Thus, no trading would take place, until both buyers and sellers agree on a new price level that better represents the value of the underlying stock. In the linear market model, there is a "first mover advantage". Due to the fixed relationship between price and shares, participants who react quickly on news that has great impact on the value of the idea will be able to gain immediate profits by buying or selling quickly. This "first mover advantage" can occur in two different situations.

In the first situation, there can be first mover advantage at the moment of an IPO. Suppose that each idea starts with a fixed price of say $10, and also that each idea has the same slope A. Under such circumstances, it may be very lucrative to monitor the idea market continuously and buy shares immediately of newly introduced ideas. As a result, the price will go up, and when other participants will buy shares, the price will go even higher. At that point, the early mover may already decide to sell, at the higher price, and thus gain quick profits. One solution to this "first mover advantage" during IPO is to introduce a pre-registration period. During this period, investors can express interest for an idea to give an early indication of its value, before real trading starts. This can be done in two ways. Firstly, investors could buy a number of shares for a fixed price (again say $10). Suppose that in total X1 shares are sold for this IPO price of $10. The market value of the idea at IPO is still equal to $\frac{1}{2} \cdot P1 \cdot X1 (= \frac{1}{2} \cdot A \cdot X1 \cdot X1)$ which means that the slope A would no longer be the same for each idea. The second option is to keep the slope A constant for each idea but allow the share price at the point of market entry to vary. In this case, investors would allocate a certain amount of money towards the idea, and the starting share price would be based upon the total investment prior to market entry. With both options, traders who feel that the idea is really valuable and that the price will go up over time, will want to pre-register because then they get the shares at the lowest price possible. This should ensure that the starting market-value of the idea is representative of its true estimated value compared to the other ideas and removes the first mover advantage during an IPO.

A second situation in which a first mover advantage can occur, is during the normal trading lifecycle of an idea. Sudden information may become available that has a great impact on the value of the idea. This situation cannot be prevented with the linear market model. In practice, this is not a great issue. Firstly, because participants that have earlier access to the information would with a normal market model also be able to gain an advantage due to that information. Secondly, since the underlying assets are ideas, it is not likely that there will be many events that have a dramatic impact on the value of those ideas. Finally, first mover advantage will only be gained by people who are actively participating. The presence of this first mover advantage will therefore only motivate participants to be more actively involved with the trading, which will make the whole idea market more valuable.

Another facet of the IMS system 10 is a mechanism to influence the share price through other factors in addition to supply and demand. As an example, one of these factors could be the identity of someone providing feedback through the discussion forums. From an idea generation point of view, it is better to provide anonymous comments, because then there will be no social barriers for anyone to provide feedback. On the other hand, from an idea evaluation point of view, comments should not be anonymous because the comments of a respected researcher who has made many breakthrough inventions are often more relevant than the comments of someone with no experience in a certain area. Since idea markets according to the envisaged embodiments of the present invention aim to improve both idea generation and idea evaluation, it might be desirable to keep the feedback anonymous but manipulate the share price directly based upon the identity of the person providing feedback. Other factors that might be used similarly for share price manipulation include but are not limited to:

Investments or comments by key inventors in the organization;
Completeness of an idea description;
Agreement between inventor(s) and the public on the idea risk assessments;
Commercial value of the idea as indicated by the risk assessments;
Total number of comments per idea;
Other factors that are embedded in the risk assessments.

The share price modification can be performed in two ways. Firstly, the price-quantity function could be modified into the following algorithm:

$$P = A \cdot X + \Sigma \alpha_i \cdot F_i$$

in which $\alpha_i$ is a weighted coefficient for the factor $F_i$. The coefficients can be optimized over time through a learning mechanism. More particularly, periodically idea success (e.g., success being measured by ideas being selected for implementation or rejected) can be compared with the ranking of the share prices. The $\alpha_i$ coefficients will then be optimized such that the correlation between the idea success and the idea ranking based on share price will be maximized. The algorithm will then use these new coefficients for the coming period. At the end of the next period, a new coefficient optimization will be carried out. Other factors based on characteristics of the ideas, participants, trades and of the organization can be candidates for inclusion into the list of factors. A periodic analysis can research which factors have significant correlation with the idea ranking. If there is such significant correlation, then the factor will be included in the algorithm. The value of the weighted coefficients $\alpha_i$ can be calculated by a goal-seek function which will optimize the coefficients such that the correlation between the share prices P(n) and the idea ranking based on idea selection will be largest.

The second method to manipulate the share price of an idea is based on an automated electronic "company fund manager" agent. This agent is similar to other participants in that it can also buy and sell shares of a particular idea. The difference is that this automatic agent will conduct trades only when some of the factors above change, with the objective of the trade to achieve the same desired price change effect as the algorithm would have.

It will be understood that the embodiments described herein are merely exemplary and that a person skilled in the art may make many variations and modifications without departing from the spirit and scope of the invention. All such variations and modifications are intended to be included within the scope of the present invention.

We claim:

1. A computer implemented method for use in generating and evaluating ideas in an organization, said method comprising the steps of:
    (a) obtaining a description of an idea;
    (b) making the description of the idea available to a plurality of participants in the organization;
    (c) making a plurality of shares associated with the idea available to the participants so that the participants can trade the shares and thereby invest investment units in the idea, the shares having a price associated therewith;
    (d) receiving a plurality of orders from at least some of the participants, each of the orders including a request to make a trade involving at least one of the shares; and
    (e) completing the orders, said completing step including the step of (f) automatically determining the price of the shares associated with the idea for each of the orders using a predetermined mathematical formula, which is based at least partially on the price of the shares immediately prior to the completion of said each order, said determining step (f) being performed at the time of completing said each order, the mathematical formula being further based on the number of shares involved in said each order, the mathematical formula including a linear price-quantity function such that the price of the shares used for completing said each order is different from the price of the shares immediately prior to the completion of said each order,
    (g) wherein each of said obtaining step (a), said making steps (b) and (c), said receiving step (d) and said completing step (e) is performed at least partially by a computer; and
    (h) wherein the idea is evaluated, at least partially, based on the investment units made in the idea.

2. The method of claim 1, wherein the function is based at least partially on the price of the shares and the total number of the shares owned by the participants.

3. The method of claim 2, wherein the function is $P = A \cdot X$, wherein P is the price of the share, X is the total number of the shares owned by the participants, and A is a predetermined constant.

4. The method of claim 3, wherein the price of the shares used for the completion of said each order equals to $P_0 + \frac{1}{2} \cdot A \cdot \Delta X$, wherein $P_0$ is the price of the shares immediately prior to the completion of said each order, and $\Delta X$ is the number of shares involved in said each order.

5. The method of claim 1, wherein the number of the shares that can be owned by the participants is infinite.

6. The method of claim 1, wherein said making step (c) includes the step (i) providing a pre-registration period for the participants to express interest in purchasing the shares before the shares are initially offered to the participants for purchase.

7. The method of claim 6, wherein the mathematical formula is determined based on the level of interest expressed by the participants during the pre-registration period.

8. The method of claim 6, wherein said providing step (i) includes the step of (j) initially offering the shares to the participants for purchase at a fixed price.

9. The method of claim 6, wherein said providing step (i) includes the step of (k) receiving an indication from at least one of the participants to allocate a specified amount of investment units for purchasing at least some of the shares; and (l) determining the price of the shares for an initial offering thereof based on the total of the specified amount received from the at least one of the participants.

10. The method of claim 1, wherein the orders include a first order to buy at least one of the shares and a second order to sell at least one of the shares.

11. The method of claim 1, wherein the idea includes a plurality of ideas, the mathematical formula associated with one of the plurality of ideas being different from the mathematical formula associated with another of the plurality of ideas.

12. The method of claim 1, wherein each of the participants is allowed to modify the description of the idea.

13. The method of claim 1, wherein the idea is evaluated by each of the participants on a plurality of criteria through a plurality of predefined scores.

14. The method of claim 1, further comprising the step of (m) allowing the participants to conduct a discussion concerning the idea such that each of the participants can provide feedback to the idea.

15. The method of claim 14, wherein the feedback can be made by each of the participants anonymously.

16. The method of claim 1, further comprising the step of (n) notifying at least some of the participants of types of events of which the at least some of the participants have previously indicated that they want to be notified.

17. The method of claim 1, further comprising the steps of (o) determining a ranking order of the participants based the values of their portfolios of investments; and (p) making the ranking order available to the participants.

18. The method of claim 1, further comprising the steps of (q) allowing the participants to make changes to the description of the idea; and (r) making an audit trail of the changes available to the participants.

19. The method of claim 1, wherein the mathematical formula is based on at least one weighted factor, the at least one weighted factor including the number of the shares.

20. The method of claim 19, wherein the idea includes a plurality of ideas, the at least one weighted factor being optimized over time by comparing a priority associated with the plurality of ideas and the final success of the plurality of ideas within the organization.

21. The method of claim 1, wherein the price of the shares is based on a risk assessment.

22. The method of claim 1, wherein the mathematical formula is at least partially based on factors related to characteristics of the participants.

23. The method of claim 1, wherein said orders include orders for short sales.

24. The method of claim 1, wherein said investment units include cash.

25. A system for use in generating and evaluating ideas in an organization, said system comprising at least one processor configured to:
(a) obtain a description of an idea;
(b) make the description of the idea available to a plurality of participants in the organization;
(c) make a plurality of shares associated with the idea available to the participants so that the participants can trade the shares and thereby invest investment units in the idea, the shares having a price associated therewith;
(d) receive a plurality of orders from at least some of the participants, each of the orders including a request to make a trade involving at least one of the shares; and
(e) complete the orders, said at least one processor being configured to automatically determine the price of the shares associated with the idea for each of the orders at the time of completing said each order using a predetermined mathematical formula, which is based at least partially on the price of the shares immediately prior to the completion of said each order, the mathematical formula being further based on the number of shares involved in said each order, the mathematical formula including a linear price-quantity function such that the price of the shares used for completing said each order is different from the price of the shares immediately prior to the completion of said each order,
(f) wherein the idea is evaluated, at least partially, based on the investment units made in the idea.

* * * * *